April 7, 1970     P. M. LLEWELLYN     3,505,517
ION CYCLOTRON RESONANCE MASS SPECTROMETER WITH MEANS
FOR IRRADIATING THE SAMPLE WITH OPTICAL RADIATION
Filed Aug. 4, 1967     3 Sheets-Sheet 1

INVENTOR.
PETER M. LLEWELLYN
BY
*W<sup>m</sup> J Nolan*
ATTORNEY

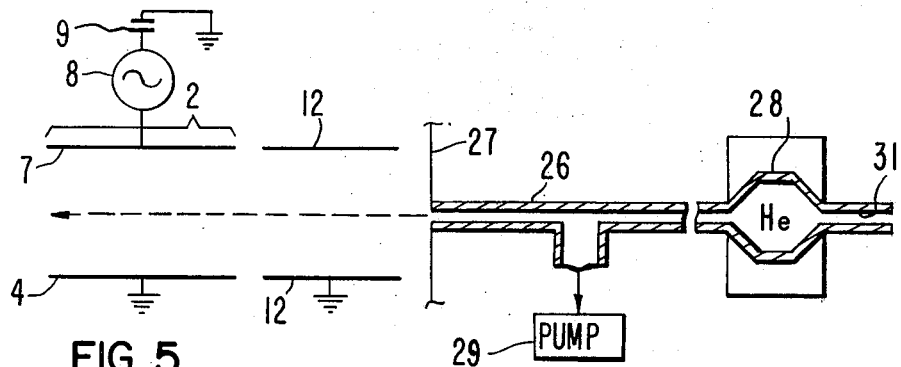
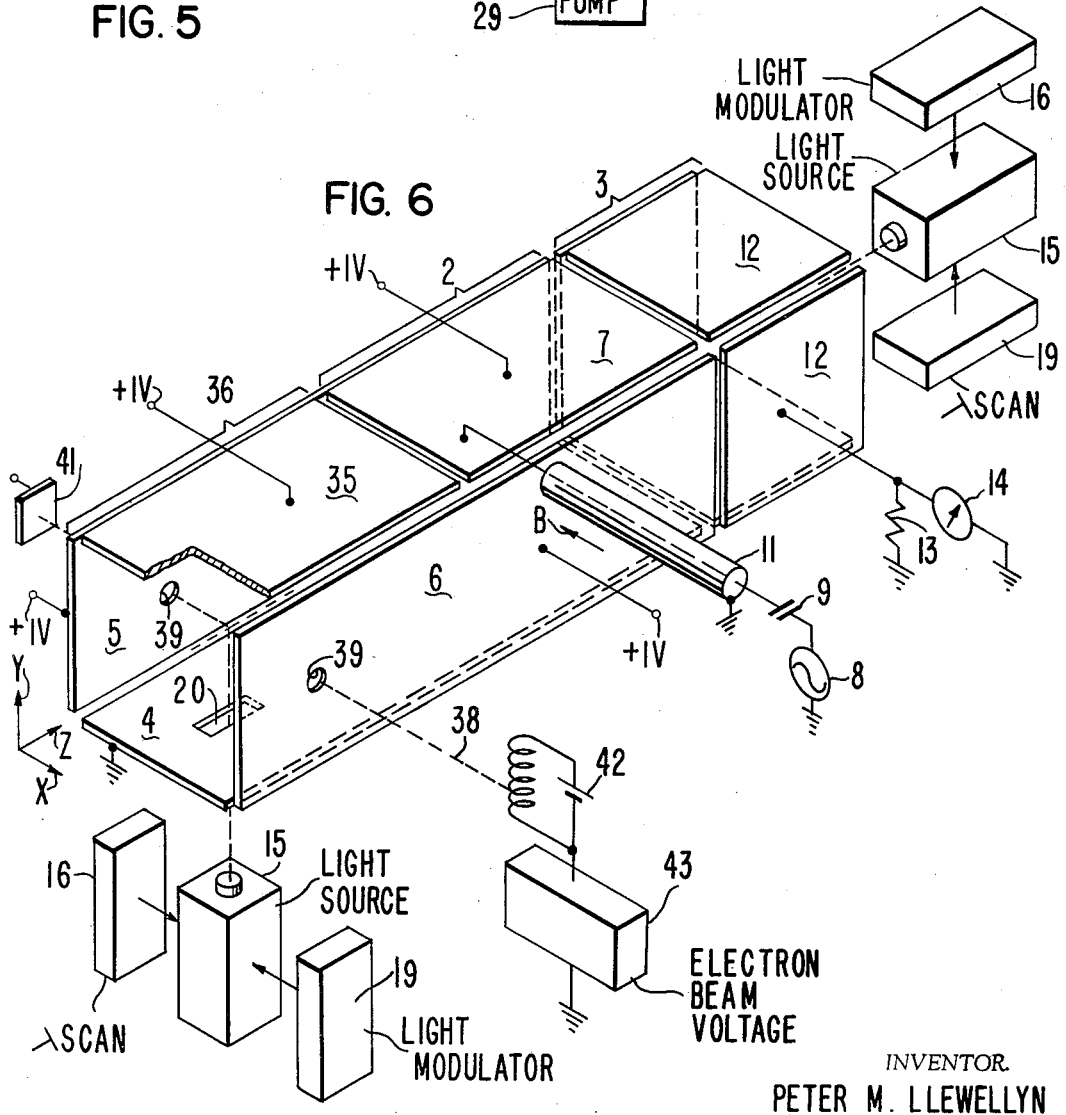

United States Patent Office 3,505,517
Patented Apr. 7, 1970

3,505,517
ION CYCLOTRON RESONANCE MASS SPECTROM-
ETER WITH MEANS FOR IRRADIATING THE
SAMPLE WITH OPTICAL RADIATION
Peter M. Llewellyn, Menlo Park, Calif., assignor to
Varian Associates, Palo Alto, Calif., a corporation of California
Filed Aug. 4, 1967, Ser. No. 658,365
Int. Cl. H01j 39/36
U.S. Cl. 250—41.9                    8 Claims

ABSTRACT OF THE DISCLOSURE

An ion cyclotron resonance mass spectrometer method and apparatus is disclosed wherein the sample gases to be analyzed are irradiated with optical radiation and the effects observed by monitoring the absorption of radio frequency energy by the cyclotron resonant ions. Photo-ionization and photo-chemical reactions may be observed in the spectrometer. In photo-ionization measurements, the gas to be analyzed is irradiated by the optical radiation to produce ionization of the gas. The ion species are analyzed by exciting and detecting ion cyclotron resonance of the photo-ionization products. The optical radiation may be modulated at certain frequencies and changes in the absorption of radio frequency energy by the resonant cyclotron ions observed at frequencies related to the modulation frequency, whereby the photo-ionization effects are more precisely observed. In certain ionization potential measurements, the wavelength of the ionizing optical radiation is scanned while monitoring ion cyclotron resonance of certain ion products to obtain a precise measure of the ionization potential of the certain ion products. In another embodiment of the present invention, certain photo-chemical reactions are analyzed by irradiating the sample to be analyzed with optical radiation to produce certain reaction products, for example, dissociation products. The dissociation products are then irradiated by an ionizing electron beam to produce ion products. The ion products are analyzed by exciting and detecting ion cyclotron resonance of the ions.

DESCRIPTION OF THE PRIOR ART

Heretofore, sector type mass spectrometers have been employed for observing products of photo-chemical reactions. In these prior spectrometers, the gaseous material to be analyzed was irradiated within the ion source region by a beam of optical radiation. The ion products of the photo-ionization reactions and the ion products of combined photo-chemical and electron-ionization reactions were accelerated out of the ion source and through the magnetic analyzing region of the spectrometer for detection and analysis according to their ratio of charge-to-mass. The problem with this type of spectrometer is that the ionized gaseous products are analyzed in a region substantially removed from the region in which they are generated. As a consequence, a substantial percentage of the products is lost between the time the photo-ionization or photo-chemical reaction occurs and the time the reaction products are analyzed. Therefore, the need exists for a method and apparatus which can analyze photo-ionization and photo-chemical reactions in the region in which they take place or in a region very closely spaced to the region in which they take place.

Recently, ion cyclotron resonance spectrometers have been developed which permit ionization and analysis of the ions to occur in substantially the same region of space or closely spaced regions of space. Such a spectrometer is described and claimed in copending U.S. patent application 456,173 filed May 17, 1965 now U.S. Patent 3,390,- 265, issued June 25, 1968 and assigned to the same assignee as the present invention. However, this type of ion cyclotron resonance spectrometer has not, heretofore, included means for performing photo-ionization or photo-chemical analysis.

SUMMARY OF THE PRESENT INVENTION

The principal object of the present invention is the provision of an improved ion cyclotron mass spectrometer method and apparatus.

One feature of the present invention is the provision, in an ion cyclotron resonance mass spectrometer, of means for irradiating the gaseous material to be analyzed with optical radiation to effect certain changes in the gaseous material, whereby the photoproduced changes in the gaseous material may be detected by monitoring the absorption of radio frequency energy at the ion cyclotron resonance frequency of ionized gaseous products of the photon induced reactions.

Another feature of the present invention is the same as the preceding feature wherein the optical radiation is modulated at a certain frequency and the detected radio frequency ion cyclotron resonance is monitored for changes in the resonance at frequencies related to the optical modulation frequency, whereby photo-ionization and photo-chemical reactions may be precisely monitored.

Another feature of the present invention is the same as any one or more of the preceding features wherein the photo-chemical reaction products produced by irradiation of the sample by optical radiation are further subjected to a beam of ionizing radiation, such as a beam of electrons, to produce ion products monitored by exciting and detecting ion cyclotron resonance thereof.

Another feature of the present invention is the same as any one or more of the preceding features including means for scanning the wavelength of the optical radiation applied to the sample material for observing photo-ionization and photo-chemical reactions as a function of the energy of the irradiating light.

Other features and advantages of the present invention will become apparent upon a perusal of the following specifications taken in connection with the accompanying drawings wherein:

BRIEF DESCRIPTION OF THE DRAWINGS

FIG. 5 is a schematic diagram of an alternative ion cyclotron resonance spectrometer of the present invention, FIG. 6 is a schematic perspective diagram of an ion cyclotron resonance spectrometer incorporating features of the present invention.

DESCRIPTION OF THE PREFERRED EMBODIMENTS

Figure 1:
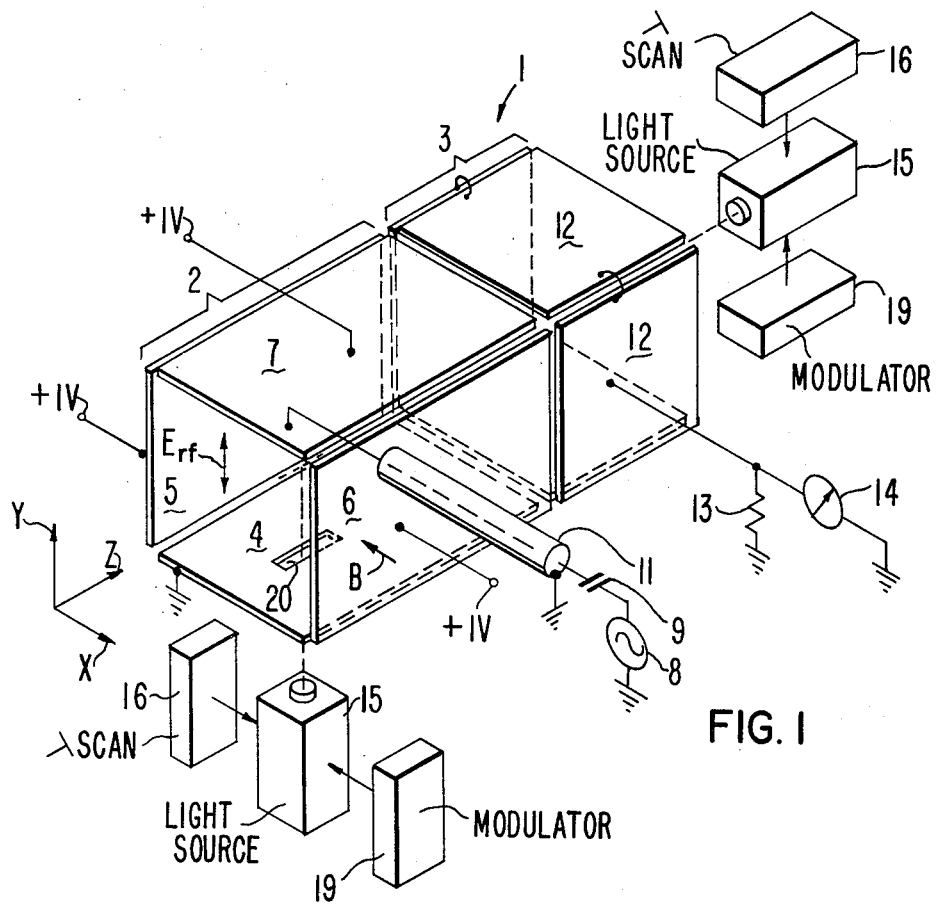
FIG. 1 is a schematic perspective view of an ion cyclotron resonance spectrometer incorporating the features of the present invention.

Referring now to FIG. 1 there is shown the electrode structure 1 for an ion cyclotron resonance mass spectrometer. The electrode structure 1 is generally of a rectangular box shape which is open at its ends and disposed within an evacuated envelope structure, not shown. The electrode structure 1 includes a pair of axially aligned regions, an analyzer region 2 and an ion collector region 3. The analyzer region 2 includes a rectangular base plate electrode 4 which is grounded and which closes off one side of the rectangular structure 1 formed by a pair of side plate electrodes 5 and 6 and a top plate electrode 7. The side electrodes 5 and 6 and top electrode 7 are operated at a slight positive D.C. bias potential with respect to the grounded base plate 4. A suitable bias potential for the side and top plates is plus one volt. The top plate 7 is excited with radio frequency energy derived from marginal oscillator 8 via coupling capacitor 9 and coaxial lead 11. A radio frequency potential applied to the top plate 7 with respect to the grounded base plate 4 produces a radio frequency electric field $E_{R.F.}$ in the analyzer region 2 for exciting cyclotron resonance of ions within the analyzing region 2.

The ion beam collector region 3 is formed by a hollow four-sided electrode structure 12. The four plates 12 are electrically connected together and connected to ground via a resistor 13. A voltmeter 14 is connected across the resistor 13 for measuring the collected ion current. The open ended ion collector electrode structure forms the subject matter of and is claimed in copending U.S. patent application 658,367 filed Aug. 4, 1967 and assigned to the same assignee as the present invention.

The electrode structure 1, as contained within its evacuated envelope structure, not shown, is immersed in a unidirectional magnetic field B as of 3000 gauss. The electrode structure 1 is preferably aligned in the magnetic field with the longitudinal axis of the electrode structure 1 being parallel to the Z axis and with the magnetic field parallel to the X axis. The cyclotron resonance exciting radio frequency field $E_{R.F.}$ is directed along the Y axis. The plus one volt static potential on the side and top plates 5, 6 and 7, respectively, provides a small static electric field in the analyzing region 2 and causes the ions to follow a beam path along the Z axis with cycloidal trajectories.

Gaseous material to be analyzed is admitted into the vacuum envelope which is evacuated to a relatively low pressure on the order of $10^{-4}$ torr or below. The gaseous material is ionized by irradiating the gas with a beam of ionizing optical radiation directed into the analyzer region 2 from a light source 15. The light source 15 may be disposed at any suitable angle for directing the light beam into the analyzer region 2. For example, the bottom plate 4 in the analyzing region 2 may be apertured at 20 to permit the light beam to pass into the analyzer region 2 along the Y axis. Alternatively, the light beam may be shone into the analyzer region along the longitudinal axis of the electrode structure 1, i.e., along the Z axis. In a preferred embodiment, the light is shone into the analyzer region 2 along the Z axis as this provides the largest region of ionization within the analyzer region 2. If desired, the top plate 7 could be apertured in a manner similar to that shown for the bottom plate 4 and the light shone into the analyzer region 2 from above the electrode structure 1.

When performing photo-ionization analysis, the light produced by the light source 15 should have a wavelength sufficiently short to ionize gaseous material. Typically this means that the wavelength of the ionizing light beam should be shorter than 1500 A.

When the R.F. electric field $E_{R.F.}$ is at the cyclotron resonance frequency $\omega_c$, the ions will absorb energy from the applied R.F. electric field $E_{R.F.}$ and the cycloidal orbits of the resonant ions will be increased in diameter. The R.F. energy absorbed from the R.F. electric field $E_{R.F.}$ is detected in the oscillating detector 8 and employed to produce a resonance spectrum, as more fully described below with regard to FIG. 7. The cyclotron resonance frequency $\omega_c$ is defined by the relation:

$$\omega_c = eB/m$$

where
$e$ is the charge on the ion,
$m$ is the mass of the ion, and
B is the magnetic field intensity.

In certain ionization potential measurements, the radio frequency electric field is set to a frequency to monitor ion products produced by the ionizing optical radiation and the wavelength of the optical radiation is scanned while monitoring the signal amplitude of the ion cyclotron resonance of a certain ion product. The energy level of the ionizing optical radiation is scanned by causing the light source 15 to produce a single unique wavelength of optical radiation and then to scan wavelengths of the optical radiation. A device which will produce a scanned wavelength is a scanned monochrometer. Thus a $\lambda$ scan generator 16 scans the light source 15 while the ion cyclotron resonance of a certain ion specie is detected.

Figure 2:
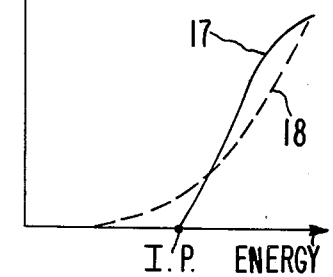
FIG. 2 is a plot of ion cyclotron resonance amplitude A versus quantum energy of the ionizing beam of optical radiation.

As the wavelength of the ionizing light source is increased, its energy is decreased. At the point where the wavelength is increased to a value which ceases to produce an ion cyclotron resonance signal the ionization potential of the certain ion specie being observed is determined. A typical plot of ion resonance signal amplitude versus energy of the optical radiation is as shown in FIG. 2 by the solid line 17. The point I.P., at which line 17 intersects the base line, determines the ionization potential of the certain ion specie being monitored.

The use of a monochromatic light beam as the source of ionizing radiation is especially desirable as the energy of the light beam is uniquely defined by the wavelength thereof. Therefore, the ionization potential point I.P. can be very accurately discerned. Typically, electron ionizing beams are utilized for producing ions to be monitored. However, the velocity and energy spread in the electrons of the ionizing beam makes it difficult to define a precise ionization potential. Typical electron beam derived ionization potential curves are as shown by dotted line 18 of FIG. 2.

A light modulator 19 is preferably employed for modulating the intensity of the ionizing light beam at a certain convenient predetermined frequency, for example, 50 hertz in order to facilitate detection of the photo-ionizing effects, as more fully described below with regard to FIG. 7.

Figure 3:
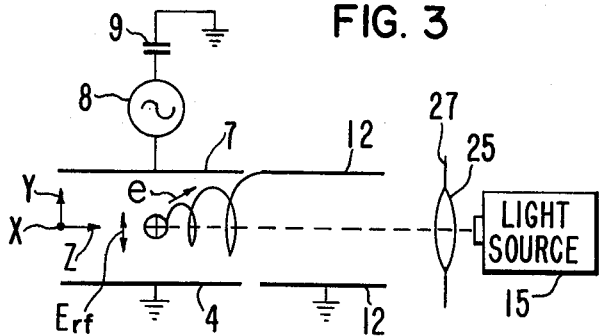
FIG. 3 is a schematic line diagram of the structure of FIG. 1.
Figure 4:
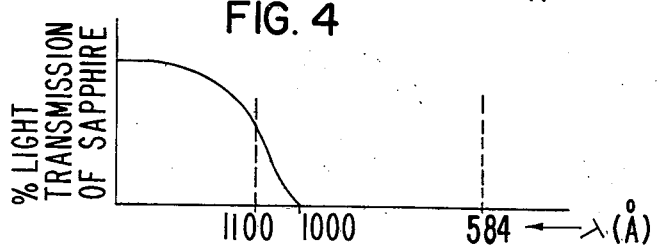
FIG. 4 is a plot of percent light transparency of a sapphire window versus wavelength $\lambda$ in A. of light to be transmitted through the window.

Typically, it is more convenient to locate the light source 15 outside of the vacuum envelope of the spectrometer. However, light transmissive window materials must be selected with care to prevent absorption of the desired wavelengths of the optical radiation in the window material. For example, the light transmissive characteristics of a sapphire window are shown in FIG. 4 and it is seen that for most of the ionization radiation between wavelengths of 584 to 1200 A. sapphire has relatively poor light transmissive characteristics but is relatively transmissive above 1100 A. A window 25 is typically sealed into the vacuum envelope of the tube as indicated in FIG. 3 and the light is shone through the window into the analyzing region 2.

Referring now to FIG. 5 there is shown an alternative apparatus for transmitting ionizing optical radiation into the analyzing region 2. Instead of the window 25, as shown in FIG. 3, a capillary tube 26 is sealed to the envelope 27. A helium glow discharge is produced in a bulb 28 at one end of the capillary 26 and a vacuum pump 29 is connected into the capillary 26 between the vacuum envelope 27 and the bulb 28. Helium gas flows into the bulb 28 via an input line 31 from a source of gas, not shown. Inside the bulb 28, the helium is electrically excited to give off its characteristic resonance radiation which is approximately 584 A. in wavelength. The emitted light is transmitted down the capillary 26 and into the electrode structure 1 for ionizing the gaseous sample material within the analyzing region 2. The pump 29 continuously evacuates the capillary 26 and the vacuum envelope 27.

Referring now to FIG. 6 there is shown an alternative ion cyclotron resonance mass spectrometer of the present invention. In this embodiment, the electrode structure 1 is substantially identical to that previously described with regard to FIG. 1 with the exception that the bottom and side plates 4, 5 and 6 have been extended past the end of the analyzer region 2 and an additional metal plate electrode 35 is provided over this extension to form an ion source region 36. In the ion source region 36, the side plates 5, 6 have been apertured at 39 in transverse alignment to accommodate passage of an electron beam therethrough. An electron beam is produced by a filamentary emitter 37 and projected along a beam path 38 through the aligned apertures 39 in the side plates 5 and 6 to a collector electrode 41.

The filamentary emitter 37 is supplied with heating current from a current source 42 connected across the filament 37 and the filament is connected to the output of an electron beam voltage source 43 to provide an adjustable beam voltage for the electron beam 38 for controlling the ionizing potential of the electron beam. The electron beam 38 serves to ionize gaseous sample constituents within the ion source region 36.

The ion cyclotron resonance mass spectrometer of FIG. 6 is especially useful for observing certain photo-chemical reactions. The beam of optical radiation which is applied to the gases to be analyzed can be adjusted in energy to dissociate the gas or to produce certain photo-chemical reactions. The reaction products are then ionized by the electron beam and the ions are excited into cyclotron resonance and detected by the oscillator 8 for analyzing the reaction products. If desired, the radio frequency electric field for exciting ion cyclotron resonance may be applied to both top plate electrodes 7 and 35 to produce ion cyclotron resonance in the ion source region 36. This latter expedient may be desirable for analyzing certain photo-chemical reactions that take place so rapidly that the reaction products would not live long enough to drift from the source region 36 into the analyzing region 2 to be detected. In such a case, these very short lived reaction products may be analyzed by applying an ion cyclotron resonance exciting radio frequency field within the source region 36.

Figure 7:
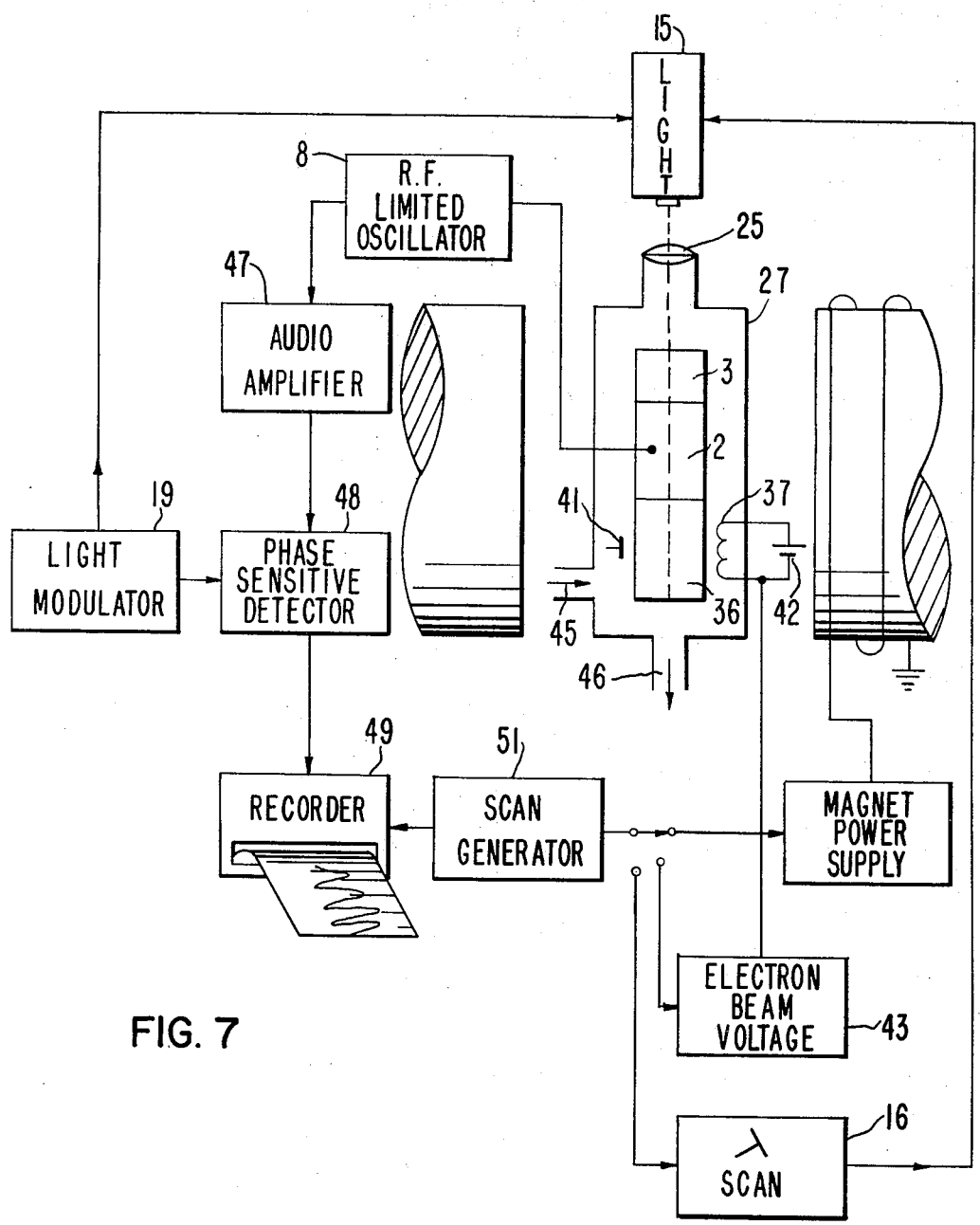
FIG. 7 is a schematic block digaram of an ion cyclotron resonance spectrometer incorporating features of the present invention.

Referring now to FIG. 7, there is shown an ion cyclotron resonance spectrometer of the present invention. The gas to be analyzed is introduced into the evacuated envelope 27 via inlet 45. The envelope is continuously evacuated via exhaust port 46 which is connected to the vacuum pump, not shown. In case ionization potentials are to be determined, the electron gun is not energized and the light beam generated by light source 15 is set to an ionizing wavelength and the wavelength scan energized to scan with increasing wavelength and thus decreasing energy of the ionizing radiation. A radio frequency limited oscillator 8 (also known as a marginal oscillator and as an oscillating detector) is set to a frequency to produce cyclotron ion resonance of ion products produced by the ionizing light beam.

The light source 15 is modulated by light modulator 19 at a convenient audio frequency such as 50 hertz. This serves to modulate the production of the ions and, thus, the intensity of the absorption of radio frequency energy from the limited oscillator 8. The periodic absorption of energy at the light modulation frequency is detected in the output of limited oscillator 8 and amplified via audio amplifier 47 and fed to one input of a phase sensitive detector 48. In the phase sensitive detector, the modulated resonance signal is compared with a sample of the light modulation frequency to produce a very low frequency D.C. resonance signal having an amplitude proportional to the number of ions produced by the ionizing light beam. The D.C. signal is recorded in a recorder 49 as a function of a scan signal derived from scan generator 51 which serves to scan the wavelength of the ionizing optical radiation via λ scan 16. The recording in recorder 49 will be a plot similar to that shown in FIG. 2 from which the ionization potential of the ionized gas can be ascertained.

In case it is desired to monitor a certain photo-chemical reaction, the electron gun 37 may be energized to produce the ionizing beam of electrons 38. The light source 15 may then be set to a wavelength to produce a certain desired photo-chemical reaction. The electron beam voltage may then be set to a value to produce ionization of certain of the photo-chemical reaction products and the scan generator 51 connected to the magnet power supply for scanning the magnetic field to obtain the mass spectrum of the ion products of the photo-chemical reaction. Once the ion products have been identified by the mass spectrometer scan, the mass spectrometer may be set to monitor one of the reaction products while the electron beam voltage is scanned to derive the ionization potential for that reaction product.

In summary, the advantage of the apparatus of FIG. 1, for photo-ionization analysis, is that use of the light beam for ionizing gaseous material avoids large electron background signals and provides a unique precisely defined ionization potential. The structure of FIG. 6 is especially advantageous for observing photo-chemical reaction, as the reaction products may be ionized and analyzed in nearly the same or in the same region of space, thereby permitting short-lived reactions to be monitored. Typical photo-chemistry wavelengths for light source 15 range between 10,000 A. and 2,000 A.

Since many changes could be made in the above construction and apparently widely different embodiments of this invention could be made without departing from the scope thereof, it is intended that all matter contained in the above description or shown in the accompanying drawings shall be interpreted as illustrative and not in a limiting sense.

What is claimed is:

1. In an ion cyclotron mass spectrometer, means for immersing a sample of gaseous material to be analyzed in a unidirectional magnetic field, means for ionizing the sample material, means for exciting and detecting ion cyclotron resonance of the ionized material, the improvement comprising, means for irradiating the sample material with optical radiation to effect changes in the sample material to be monitored by the detected ion cyclotron resonance of the ionized material, means for modulating the optical radiation at a predetermined modulation frequency, and means for detecting changes in the detected ion cyclotron resonance at a frequency related to said modulation frequency.

2. The apparatus of claim 1 wherein said optical radiation is approximately monochromatic.

3. The apparatus of claim 1 including means for scanning the wavelength of the optical radiation.

4. The apparatus of claim 1 including means for causing the ions to traverse a predetermined beam path, and means forming an electrode structure along the beam path to define an analyzing region of the beam path and for applying a radio frequency electric field to the beam to produce ion cyclotron resonance of the ions of the beam.

5. The apparatus of claim 1 wherein said means for ionizing the gaseous sample material includes means for irradiating the gaseous material with electrons.

6. The apparatus of claim 5 wherein said means for exciting and detecting ion cyclotron resonance of the ionized material includes means for producing and applying to the ionized gaseous material radio frequency energy at the cyclotron resonance frequency of at least one ion specie of said ionized gaseous material, and wherein said ion cyclotron resonance detecting means includes means for detecting the absorption of the applied radio frequency energy by the resonant ion specie.

7. Method for analyzing a sample of gas comprising the steps of, immersing the gas in a unidirectional magnetic field, irradiating the sample of gas with optical radiation to produce certain gaseous products, irradiating the gaseous products with a stream of electrons for ionizing at least certain ones of the gaseous products, and exciting and detecting ion cyclotron resonance of the gaseous products.

8. The method of claim 7 wherein the optical radiation which irridiates the sample of gas is selected to have a wavelength sufficiently short to ionize the gaseous products.

References Cited
UNITED STATES PATENTS 2,632,112  3/1953  Washburn et al. _____ 250—41.9

OTHER REFERENCES

The Journal of Chemical Physics, vol. 28, No. 1, Hwizeler et al., January 1958, pp. 76 to 82.

The Journal of The Optical Society of America, vol. 49, No. 4, Weissler et al., April 1959, pp. 338–340.

Review of Scientific Instruments, vol. 36, No. 4, Wobschall, pp. 466–475, April 1965.

RALPH G. NILSON, Primary Examiner

ANTHONY L. BIRCH, Assistant Examiner